(12) United States Patent
von Zanthier et al.

(10) Patent No.: US 7,518,127 B2
(45) Date of Patent: Apr. 14, 2009

(54) SUB-WAVELENGTH IMAGING AND IRRADIATION WITH ENTANGLED PARTICLES

(76) Inventors: Joachim von Zanthier, Aurel-Voss-Strasse 2a, 80997 Munich (DE); Christoph Thiel, Kastanienweg 1c, 90768 Fürth (DE); Enrique Solano, Lily-Braun-Weg 9, 80637 Munich (DE); Thierry Bastin, Rue des Nations, 8, 4102 Ougree (BE); Girish S. Agarwal, 922 S. Westoak, Stillwater, OK (US) 74078

( * ) Notice: Subject to any disclaimer, the term of this patent is extended or adjusted under 35 U.S.C. 154(b) by 266 days.

(21) Appl. No.: 11/615,547

(22) Filed: Dec. 22, 2006

(65) Prior Publication Data
US 2008/0164426 A1 Jul. 10, 2008

(51) Int. Cl.
*G21K 5/02* (2006.01)
(52) U.S. Cl. ............... 250/492.1; 250/492.2; 250/492.3
(58) Field of Classification Search .............. 250/492.2, 250/492.21, 492.22, 492.23, 492.24, 492.3, 250/492.1, 398, 337, 300, 317, 251, 305, 250/306, 307, 310; 209/576
See application file for complete search history.

(56) References Cited

U.S. PATENT DOCUMENTS

| | | | | |
|---|---|---|---|---|
| 6,315,955 | B1* | 11/2001 | Klein | ......................... 422/73 |
| 7,245,365 | B2* | 7/2007 | Kim et al. | ................ 356/237.2 |
| 2003/0127608 | A1* | 7/2003 | Shields et al. | ............. 250/493.1 |
| 2007/0098174 | A1* | 5/2007 | Trifonov et al. | ............. 380/256 |
| 2007/0252081 | A1* | 11/2007 | Munro et al. | ............... 250/282 |
| 2007/0272856 | A1* | 11/2007 | Nijkerk et al. | .............. 250/307 |

FOREIGN PATENT DOCUMENTS

GB 2083908 A * 3/1982
WO WO02056238 A2 * 7/2002

OTHER PUBLICATIONS

Fiurasek, J., "Conditional Generation of N-photon Entangled States of Light", May 8, 2002, Physical Review A vol. 65, pp. 053818-1 through 053818-6.*
Bjork, G et al., "Entagled-State Lithography: Tailoring Any Pattern with a Single State", May 14, 2001, Physical Review Letters vol. 86 No. 20, pp. 4516-4519.*
Zou, X et al., "Generation of Entangled Photon States by using Linear Optical Elements", Jul. 18, 2002, Physical Review A vol. 66, pp. 014102-1 through 014102-4.*
Jeong, H et al., "Greenberger-Horne-Zeilinger-type and W-type Entangled Coherent States: Generation and Bell-type Inequality Tests without Photon Counting", Aug. 17, 2006, Physical Review A vol. 74, pp. 022104-1 through 022104-8.*

(Continued)

*Primary Examiner*—Lisa M Caputo
*Assistant Examiner*—Nicole Ippolito Rausch
(74) *Attorney, Agent, or Firm*—Patterson & Sheridan, LLP

(57) ABSTRACT

A method and apparatus for using one particle out of N particles for irradiating or investigating a target are provided. A radiation source with N incoherent emitters emits a radiation, and particles of said radiation are detected by using at least N−1 detectors located at N−1 different positions. A discriminator is adapted for identifying particle detection events on at least N−1 detectors within a predetermined time period from other particle detection events.

25 Claims, 6 Drawing Sheets

OTHER PUBLICATIONS

Simon, C et al., "Creating Single Time-Bin-Entangled Photon Pairs", Jan. 29, 2005, Physical Review Letters vol. 94, pp. 030502-1 through 030502-4.*

B. B. Blinov et al., "Observation of entanglement between a single trapped atom and a single photon," Nature, Mar. 2004 vol. 428: pp. 153-157.

J. J. Bollinger et al., "Optimal frequency measurements with maximally correlated states," Physical Review A, Dec. 1996 vol. 54(6): pp. R4649-R4652.

L. Mandel, "Photon interference and correlation effects produced by independent quantum sources," Physical Review A, Aug. 1986 vol. 28(2): pp. 929-943.

Ryan S. Bennink et al., "Quantum and Classical Coincidence Imaging," Physical Review Letters, Jan. 2004 vol. 92(3): pp. 033601-1-033601-4.

Y. Shih, "Quantum imaging, quantum lithography and the uncertainty principle," Eur. Phys. J. D, 2003 vol. 22: pp. 485-493.

J. Beugnon et al., "Quantum interference between two single photons emitted by independently trapped atoms," Nature, Apr. 2006 vol. 440: pp. 779-782.

Agedi N. Boto et al., "Quantum Interferometric Optical Lithography: Exploiting Entanglement to Beat the Diffraction Limit," Physical Review Letters, Sep. 2000 vol. 85(13): pp. 2733-2736.

Avi Pe'er et al., "Quantum lithography by coherent control of classical light pulses," Optics Express, Dec. 2004 vol. 12(26): pp. 6600-6605.

P. R. Hemmer et al., "Quantum Lithography with Classical Light," Physical Review Letters, Apr. 2006 vol. 96: pp. 163603-1-163603-4.

Ashok Muthukrishnan et al., "Quantum microscopy using photon correlations," Journal of Optics B: Quantum and Semiclassical Optics, 2004 vol. 6: pp. S575-S582.

G. S. Agarwal, "Quantum Statistical Theories of Spontaneous Emission and their Relation to Other Approaches," Springer Tracts in Modern Physics, 1974 vol. 70: pp. 1-129.

Roy J. Glauber, "The Quantum Theory of Optical Coherence," Physical Review, Jun. 1963 vol. 130(6): pp. 2529-2539.

G. R. Guthöhrlein et al., A single ion as a nanoscopic probe of an optical field, Nature, Nov. 2001 vol. 414: pp. 49-51.

I. Dotsenko et al., "Submicrometer Position Control of Single Trapped Neutral Atoms," Physical Review Letters, Jul. 2005 vol. 95: pp. 033002-1-033002-4.

Kaige Wang et al., "Subwavelength coincidence interference with classical thermal light," Physical Review A, 2004 vol. 70: pp. 041801-1-041801-4.

M. W. Mitchell et al., "Super-resolving phase measurements with a multiphoton entangled state," Nature, May 2004 vol. 429: pp. 161-164.

W. Dür et al., "Three qubits can be entangled in two inequivalent ways," Physical Review A, 2000 vol. 62: pp. 062314-1-062314-12.

Milena D'Angelo et al., "Two-Photon Diffraction and Quantum Lithography," Physical Review Letters, Jul. 2001 vol. 87(1): pp. 013602-1-013602-4.

Sean J. Bentley et al., "Nonlinear optical lithography with ultra-high sub-Rayleigh resolution," Optics Express, Nov. 2004 vol. 12(23): pp. 5735-5740.

M. Born et al., "The application of the Fabry-Perot interferometoer to the study of the fine structure of spectral lines," Principles of Optics, New York, Pergamon Press 1980, Section 7.6.3: pp. 333-338.

C. Cabrillo et al., "Creation of entangled states of distant atoms by interference," Physical Review A, Feb. 1999 vol. 59(2): pp. 1025-1033.

Philip Walter et al., "De Broglie wavelength of a non-local four-photon state," Nature, May 2004 vol. 429: pp.158-161.

E.S. Polzik, "Einstein-Podolsky-Rosen-correlated atomic ensembles," Physical Review A, Jun. 1999 vol. 59(6): pp. 4202-4205.

C. A. Sackett et al., "Experimental entanglement of four particles," Nature, Mar. 2000 vol. 404: pp. 256-259.

A. Kuzmich et al., "Generation of nonclassical photon pairs for scalable quantum communication with atomic ensembles," Nature, Jun. 2003 vol. 423: pp. 731-734.

M. Born et al., "Image formation in the microscope," Principles of Optics, New York, Pergamon Press 1980, Section 8.6.6: pp. 418-428.

Lord Rayleigh, "Investigation in Optics, with special reference to the Spectroscope: Resolving, or Separating, Power of Optical Instruments," Phil. Mag. S., Oct. 1879 vol. 8(49): pp. 261-276.

Lord Rayleigh, "Investigation in Optics, with special reference to the Spectroscope: Influence of Aberration," Phil. Mag. S., Oct. 1879 vol. 8(49): pp. 403-411.

Lord Rayleigh, "Investigation in Optics, with special reference to the Spectroscope: On the Accuracy required in Optical Surfaces," Phil. Mag. S., Oct. 1879 vol. 8(49): pp. 477-486.

Lord Rayleigh, "Investigation in Optics, with special reference to the Spectroscope: Aberration of Lenses and Prisms," Phil. Mag. S., Jan. 1880 vol. 9(53): pp. 40-55.

J. Eschner et al., "Light interfernce from single atoms and their mirror images," Nature, Oct. 2001 vol. 413: pp. 495-498.

G. S. Agarwal et al., "Magneto-optical spectroscopy with entangled phtons," Optics Letters, Mar. 2003 vol. 28(6): pp. 462-464.

C. W. Chou et al., "Measurement-induced entanglement for excitiation stored in remote atomic ensembles," Nature, Dec. 2005 vol. 438: pp. 828-832.

E. J. S. Fonseca et al., "Measurement of the de Broglie Wavelength of a Multiphoton Wave Packet," Physical Review Letters, Apr. 1999 vol. 82(14): pp. 2868-2871.

Keiichi Edamatsu et al., "Measurement of the Photonic de Broglie Wavelength of Entangled Photon Pairs Generated by Spontaneous Parametric Down-Conversion," Physical Review Letter, Nov. 2002 vol. 89(21): pp. 216301-1-216301-4.

C. K. Hong et al., "Measurement of Subpicosecond Time Intervals between Two Photons by Interference," Physical Review Letters, Nov. 1987 vol. 59(18): pp. 2044-2046.

G.S. Agarwal et al., "Nonclassical imaging for a quantum search of trapped ions," Physical Review A, 2004 vol. 70: pp. 063816-1-063816-4.

C. Skornia et al., "Nonclassical interference effects in the radiation from coherently driven uncorrelated atoms," Physical Review A, 2001 vol. 64: pp. 063801-1-063801-5.

* cited by examiner

SUB-WAVELENGTH IMAGING AND IRRADIATION WITH ENTANGLED PARTICLES

GOVERNMENT RIGHTS TO THIS INVENTION

This invention was made with U.S. government support under grant number CCF-0524673 awarded by the National Science Foundation. The U.S. government has certain rights in this invention.

BACKGROUND OF THE INVENTION

Embodiments of the present invention relate to a method and an apparatus for using entangled particles and, more particularly, to a microscope and a lithography apparatus.

In order to implement an N-fold increase in resolution in imaging and lithography, the following ingredients are conventionally needed: either (a) creation of an entangled state of the form $|\Psi(N)\rangle$ with high photon number N, or (b) the availability of an N-particle absorbing medium able to detect N photons at a given position simultaneously, or both. As of yet, no measures were known to overcome these disadvantages. Thus, what is needed are techniques to allow for an N-fold increase over the classical resolution limit which overcome these restrictions.

SUMMARY OF THE INVENTION

Embodiments of the present invention use an entirely different scheme to achieve an optical resolution of $\lambda/N$ when compared to the prior art. The method may involve neither of the requirements of the prior art as described above. As with path-entangled number states, such techniques may allow for an N-fold increase in resolution compared to the first order intensity correlation function $G^{(1)}(r)$ while keeping a contrast of 100%. Because the N particles may be recorded by distinct analyzers, only a single particle may be registered at each detector. This means that an N-particle absorbing material is most likely not needed in this scheme, only detectors suitable to detect one-particle events.

One embodiment of the present invention is a method for using one particle out of N particles for irradiating a target. The method generally includes providing a radiation source with N incoherent emitters detecting particles emitted from said radiation source by using N−1 detectors located at N−1 different positions, and opening a particle barrier based on an occurrence of single detections on all N−1 detectors within a predetermined time period to allow said one particle to reach said target.

Another embodiment of the present invention provides an apparatus for irradiating a target. The apparatus generally includes a radiation source with N incoherent emitters, N−1 particle detectors located at N−1 different positions, a discriminator adapted for identifying single particle detection events on all N−1 detectors within a predetermined time period from other particle detection events, and a particle barrier adapted to be opened based on the discriminator.

Yet another embodiment of the present invention is a method for using N particles for investigating an object, wherein N is greater than or equal to 2. The method generally includes fixing the position of the object, detecting particles of a radiation emitted by the object by using N detectors located at N different positions, and discriminating single particle detections detected on all N detectors within a predetermined time period from other particle detection events.

Yet another embodiment of the present invention provides an apparatus for investigating an object. The apparatus generally includes a fixing unit for fixing the position of the object, N particle detectors located at N different positions for detecting particles of a radiation emitted by the object, wherein N is greater than or equal to 2, and a discriminator adapted for discriminating single particle detection events on all detectors within a predetermined time period from other particle detection events.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

In order to describe embodiments of the present invention, a theoretical approach to a specific example is provided below. The specific example includes the use of atoms as emitters and photons as radiation particles. However, it is important to note that the invention is not limited to the described system of photons and atoms. Rather, various kinds of radiation may be employed, including photons, electrons, protons, neutrons, alpha particles, atoms, molecules and ions. At the same time, the emitters or scattering sites may be selected from the group consisting of atoms, ions, molecules, quantum dots, and Josephson circuits.

It is known that nonclassical correlations exist in the radiation of two atoms that are coherently driven by a continuous laser source. These include second order intensity correlations of spontaneously emitted photons, which are proportional to the conditional probability to detect a photon at $r_2$ and time t+τ, given that a photon has been recorded at $r_1$ and time t. It can be shown analytically that those photons can exhibit a spatial interference pattern (in the second order correlation function) not present in a classical treatment so that bunched and antibunched light is emitted in different spatial directions, even when the atoms are initially uncorrelated. The phenomena show up even without any interatomic interaction.

The spatial interference patterns for the second order correlation function are of particular interest. One of the ideas underlying embodiments of the present invention was finding spatial interference patterns of higher order correlations in the fluorescence radiation emitted by trapped particles and utilizing them for imaging and manipulation purposes. As described herein, this may allow surpassing the resolution limits of classical optics. This may be achieved by applying technical measures which may be much easier to implement than methods known from the art.

Figure 6:
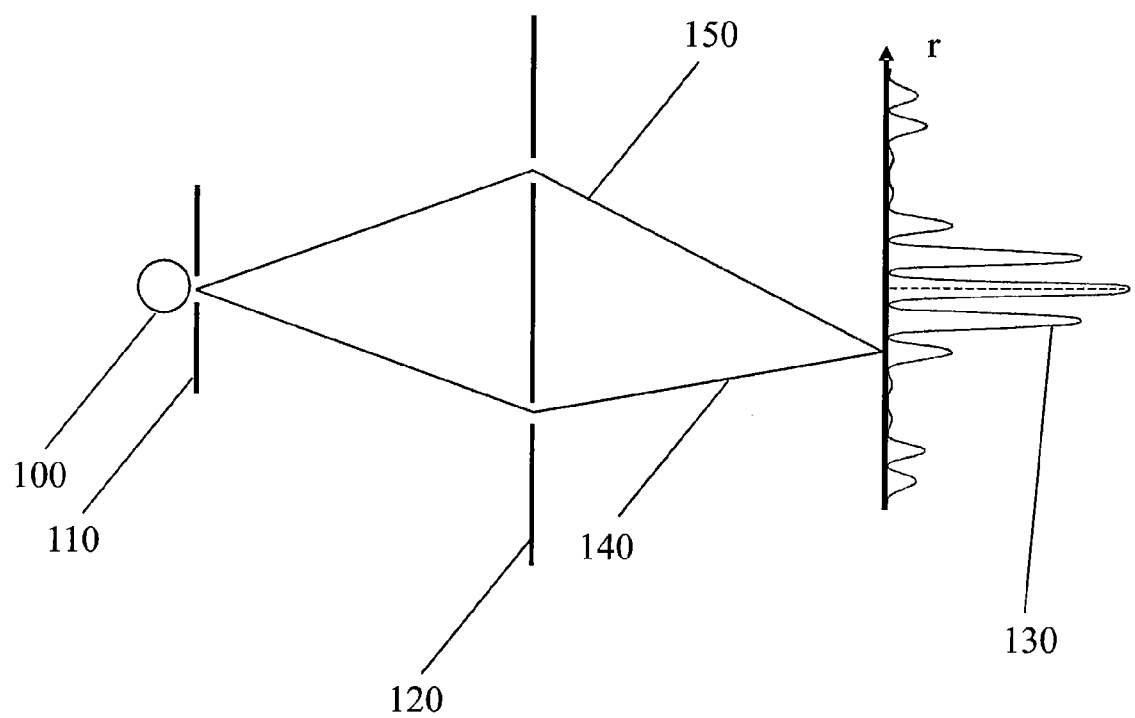
FIG. 6 is a schematic view of Young's double slit experiment.

FIG. 6 shows a schematic view of Young's double slit experiment. Shown are a light source 100, a collimation slit 110, a double slit 120, light beams 140, 150 as examples, and a far-field interference pattern $I(r) \sim G^{(1)}(r)$ 130. In this experiment (or in a Mach Zehnder interferometer), the probability $G^{(1)}(r)$ to detect a photon at position r results from the interference of the two possible paths a single photon can take to reach the detector. This may be expressed by the state $|\Psi(1)\rangle = 1/\sqrt{2}(|1\rangle_U|0\rangle_L + |0\rangle_U|1\rangle_L)$ where the subscript L(U) denotes the lower (upper) arm of the interferometer. Variation of the detector position may lead to a modulation of the form $G^{(1)}(r) = 1 + \cos \delta(r)$, where $\delta(r) = kd \sin \theta(r)$ is the optical phase difference of the waves emanating from the two slits and k, d, and $\theta(r)$ are the wave number, slit separation, and scattering angle, respectively.

Obviously, the fringe spacing of the modulation (in units of $d \sin \theta(r)$) may be determined by the optical wavelength, corresponding to the Rayleigh criterion which restricts the pattern size of the interfering beams to λ. Quantum entanglement is able to bypass the Rayleigh limit. If one considers, for example, the path-entangled two-photon state $|\Psi(2)\rangle = 1/\sqrt{2}(|2\rangle_U|0\rangle_L + |0\rangle_U|2\rangle_L)$, the two-photon state $|2\rangle$ may have twice the energy of the single photon state $|1\rangle$ in a given mode. Hence, it may accumulate phase twice as fast when propagating through the setup. This may give rise to a two-photon absorption rate of the form $G^{(2)}(r, r) = 1 + \cos 2\delta(r)$ exhibiting a fringe spacing half that of $G^{(1)}(r)$. Correspondingly, for the entangled N-photon state $|\Psi(N)\rangle = 1/\sqrt{2}(|N\rangle_U|0\rangle_L + |0\rangle_U|N\rangle_L)$ the N photon absorption rate may read $G^{(N)}(r, \ldots, r) = 1 + \cos N\delta(r)$, displaying a fringe spacing of λ/N. This gain in resolution by a factor of N with respect to $G^{(1)}(r)$ may be fruitfully applied for a wide range of applications (e.g., in microscopy, lithography, spectroscopy, and magnetometry).

N identical two-level atoms excited by a single laser pulse may be considered. After the spontaneous decay, the N resulting photons may be registered by N detectors at positions $r_1, \ldots r_N$. In case of detection within a predetermined time interval, the Nth order correlation function may be written (up to an insignificant prefactor) as $$G^{(N)}(r_1, \ldots, r_N) = \langle D^\dagger(r_1) \ldots D^\dagger(r_N) D(r_N) \ldots D(r_1) \rangle \quad (1)$$

where $$D(r_i) = \frac{1}{\sqrt{N}} \sum_{\alpha=1}^{N} \sigma_\alpha^- e^{-ikn(r_i) \cdot R_\alpha}. \quad (2)$$

Here, D is the detector operator which links the detection of a photon at $r_i$ to the emission of a photon by one (unknown) atom of all atoms situated at $R_\alpha$, where $\alpha = 1, \ldots, N$. $n(r_i) = r_i/r_i$ stands for the unit vector in the direction of detector i, the sum is over all atom positions $R_\alpha$, $k = \omega_0/c$, where $\omega_0$ is the transition frequency, and $\sigma_\alpha^- = |g\rangle_\alpha\langle e|$ is the lowering operator of atom for the transition $|e\rangle \rightarrow |g\rangle$. For all atoms initially prepared in the excited state $|e\rangle$, one obtains from Eqs. (1) and (2):

$$G^{(N)}(r_1, \ldots, r_N) = \frac{1}{N^N} |\gamma(r_1, \ldots, r_N)|^2, \quad (3)$$

where $$\gamma(r_1, \ldots, r_N) = \sum_{\substack{\epsilon_1, \ldots, \epsilon_N = 1 \\ \epsilon_1 \neq \ldots \neq \epsilon_N}}^{N} \prod_{\alpha=1}^{N} e^{-ikn(r_{\epsilon_\alpha}) \cdot R_\alpha}. \quad (4)$$

Figure 1:
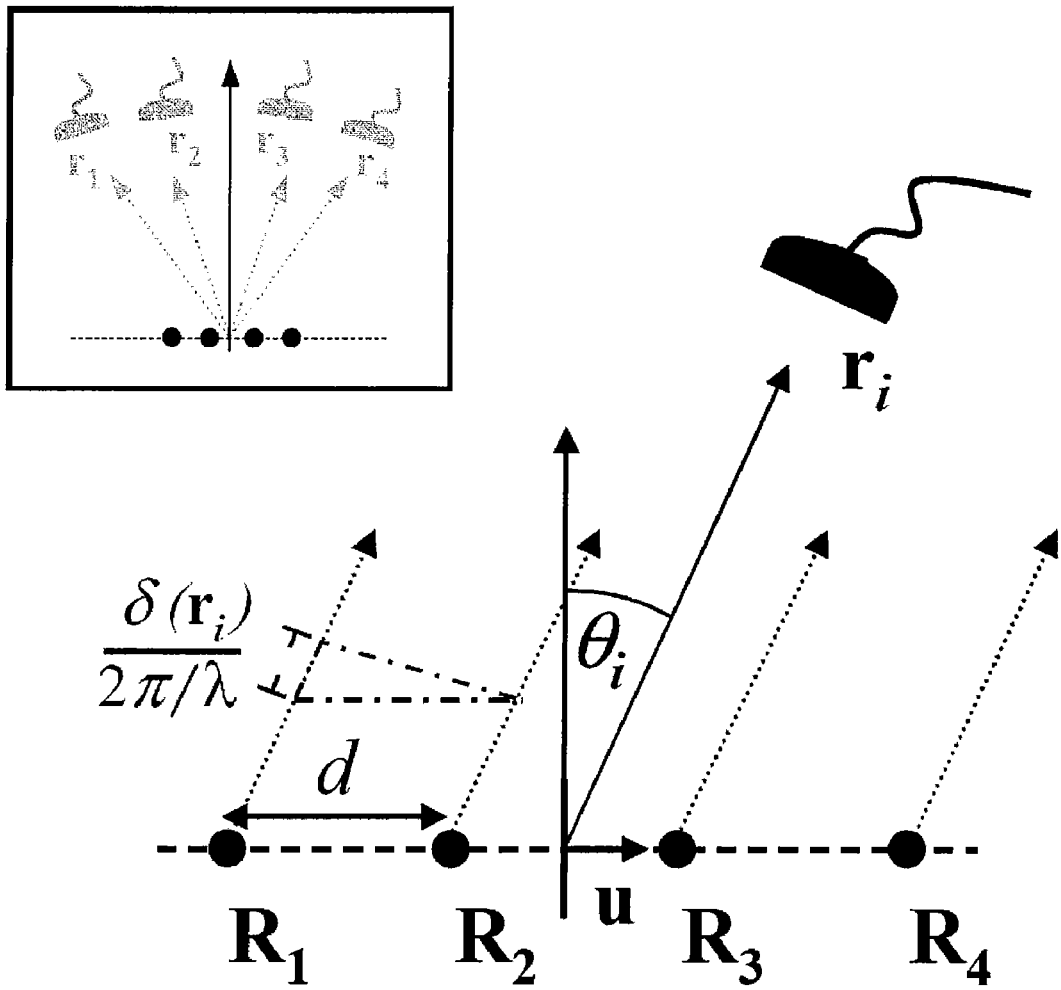
FIG. 1 illustrates a setup and coordinate system for N trapped emitters, wherein N emitters are regularly localized in an ion trap in accordance with an embodiment of the invention. The figure shows the case of N=4, with a detector at position $r_i$ at an angle $\theta_i$ with respect to an axis perpendicular to the row of emitters.

Equations (3) and (4) show that $G^{(N)}(r_1, \ldots, r_N)$ results from the interference of N! terms, associated with all possibilities to scatter N photons from N identical atoms which are subsequently registered by N detectors. To simplify further calculations, the case of N equidistant atoms may be assumed. Choosing the origin of the coordinate system in the center of the atomic chain leads to $$R_\alpha = j_\alpha d u \quad (5)$$

with u being the unit vector along the chain axis, d the interatomic spacing, and $j_\alpha = -(N-1)/2, \ldots, (N-1)/2$ for $\alpha = 1, \ldots, N$ (see FIG. 1). By defining $$\delta(r_i) = kdn(r_i) \cdot u = kd \sin \theta_i \quad (6)$$

where $\theta_i$ is the angle between $n(r_i)$ and the direction normal to the atomic chain (see FIG. 1), it may be found that $$G^{(N)}(r_1, \ldots, r_N) = \frac{1}{N^N} \left( \sum_{\substack{N! \text{ permutations} \\ \text{of the } j \text{ components}}} \cos(j \cdot \delta) \right)^2 \quad (7)$$

Here, j is the vector of the distances of the atoms from the origin in units of d:

$$j = (j_1, \ldots, j_N) \quad (8)$$

and $$\delta = (\delta(r_1), \ldots, \delta(r_N)). \quad (9)$$

Due to the symmetry of the configuration, the function $G^{(N)}(r_1, \ldots, r_N)$ contains N!/2 cosine terms, each oscillating in general with a different spatial frequency. Obviously, the complexity of the expression rises rapidly with the atom number N. However, if, for example, the N detectors are placed in such a manner that all terms in Eq. (7) interfere to give a single cosine term, a modulation oscillating at a unique spatial frequency would be left. A set of particular detector positions may be found that lead to the following general result: for arbitrary even N and choosing the detector positions such that $$\delta(r_2) = -\delta(r_1), \quad (10)$$

$$\delta(r_3) = \delta(r_5) = \ldots = \delta(r_{N-1}) = \frac{2\pi}{N},$$

$$\delta(r_4) = \delta(r_6) = \ldots = \delta(r_N) = -\frac{2\pi}{N},$$

the Nth order correlation function G(N) as a function of detector position $r_1$ may be reduced to $$G^{(N)}(r_1) = A_N[1 + \cos(N\delta(r_1))], \quad (11)$$

where $A_N$ is a constant which depends on N. For arbitrary odd N, and choosing the detector positions such that $$\delta(r_2) = -\delta(r_1), \quad (12)$$

$$\delta(r_3) = \delta(r_5) = \ldots = \delta(r_N) = \frac{2\pi}{N+1},$$

$$\delta(r_4) = \delta(r_6) = \ldots = \delta(r_{N-1}) = -\frac{2\pi}{N+1},$$

the Nth order correlation function G(N) as a function of $r_1$ may be reduced to $$G^{(N)}(r_1) = A_N[1 + \cos((N+1)\delta(r_1))]. \quad (13)$$

According to Eqs. (11) and (13), for any N a correlation signal with a modulation of a single cosine may be obtained, displaying the same contrast and similar fringe spacing as in the case of the maximally entangled N-photon state $|\Psi(N)\rangle$: for even N the fringe spacing corresponds to $\lambda/N$, for odd N it corresponds to $\lambda/N+1$). However, in contrast to $|\Psi(N)\rangle$, both the necessity to generate path-entangled Fock states and the need to detect a faint multi-photon absorption signal may be avoided. Since in this scheme the N photons may be registered by N distinct detectors, only a single photon may be recorded at each detecting device.

It should be emphasized that as the photons are created by spontaneous emission, the interference signal may be generated by incoherent light. An achievable contrast of 100% may prove the underlying quantum nature of the process (i.e., the existence of non-local correlations between the detected photons). The quantum correlations may be generated by the measurement process after the detection of the first photon. In fact, just before the detection of the Nth photon, the atomic system may be in an N-particle W-state with one excitation. The non-classical characteristics of this scheme may thus be an example of detection induced entanglement of initially uncorrelated distant particles. To exemplify the method, the simplest situation is considered, i.e., the case of N=2 atoms. With j=(−½, +½), Eq. (7) may be used to obtain:

$$G^{(2)}(r_1, r_2) = \frac{1}{2}[1 + \cos(\delta(r_1) - \delta(r_2))]. \quad (14)$$

The modulation of the $G^{(2)}(r_1, r_2)$-function may depend on the relative position of the two detectors (see FIG. 1): for $\delta(r_2)=\delta(r_1)$, the second order correlation function is a constant, whereas for fixed $r_2$ the two photon coincidence as a function of $\delta(r_1)$ exhibits the same phase modulation and fringe spacing as $G^{(1)}(r)$ in the Young's double slit experiment. The increased parameter space available for the detector positions in case of two detectors may also allow determining the relative orientation $\delta(r_2)=-\delta(r_1)$. This case may lead to $$G^{(2)}(r_1) = \frac{1}{2}[1 + \cos(2\delta(r_1))], \quad (15)$$

exhibiting a phase modulation as a function of $r_1$ with half the fringe spacing of $G^{(1)}(r)$ while keeping a contrast of 100%. This may correspond to the fringe pattern achieved with the maximally entangled two-photon state $|\Psi(2)\rangle$. The assumed condition for the direction of emission of the two photons, (i.e., $\delta(r_2)=-\delta(r_1)$) may correspond to a space-momentum correlation of the photons identical to the one present in spontaneous parametric down conversion (SPDC). This process is presently widely used for producing entangled photon pairs. Adding a beam splitter may also allow transforming the space-momentum entangled photon pair generated by SPDC into the maximally path-entangled two-photon state $|\Psi(2)\rangle$.

By using either correlated states, (i.e., space-momentum entangled photon pairs or maximally path-entangled photon number states), sub-wavelength resolution may be obtained, surpassing the Rayleigh limit by a factor of two, three and four. However, extending these schemes to states with higher numbers of entangled photons may appear to be difficult since the use of, for example, an $X^{(N)}$ nonlinearity or, alternatively, N−1 nonlinear $X^{(2)}$ crystals in a cascaded arrangement results in very low efficiencies, dropping rapidly with increasing N. By contrast, the present scheme may be extended to N>2 atoms straightforwardly in view of single atom trapping techniques known from the art. The complexity to produce path-entangled Fock states with high photon number N, as well as the necessity of an N-photon absorbing material can thus be circumvented.

Next, the third order correlation function $G^{(3)}(r_1, r_2, r_3)$ for three equidistant atoms will be examined. For arbitrary detector positions $r_1$, $r_2$, and $r_3$ it may be derived from Eq. (7):

$$G^{(3)}(r_1, r_2, r_3) = \frac{4}{27}\begin{bmatrix} \cos(\delta(r_1) - \delta(r_2)) + \\ \cos(\delta(r_1) - \delta(r_3)) + \\ \cos(\delta(r_2) - \delta(r_3)) \end{bmatrix}^2. \quad (16)$$

By positioning, for example, the two detectors according to Eq. (12), Eq. (16) may be reduced to $$G^{(3)}(r_1) = \frac{2}{27}[1 + \cos(4\delta(r_1))]. \quad (17)$$

Obviously, $G^{(3)}$ as a function of $r_1$ exhibits a modulation of a single cosine with a contrast of 100%, in this case with a fringe spacing of $\lambda/4$. Similarly, $G^{(4)}(r_1)$ may be determined where the detectors are placed according to Eq. (10):

$$G^{(4)}(r_1) = \frac{1}{8}[1 + \cos(4\delta(r_1))]. \quad (18)$$

Finally, the result may be compared with the modulation of the far field intensity $G^{(1)}(r_1)$ obtained in the case of a chain of N equidistant atoms. If each atom is initially prepared in the state $|\Phi\rangle = 1/\sqrt{2}(|g\rangle+|e\rangle)$, it may be derived from Eqs. (1) and (2)

$$G^{(1)}(r_1) = \frac{1}{2}\left[1 + \frac{1}{N}\sum_{\alpha=1}^{N-1}(N-\alpha)\cos(\alpha\delta(r_1))\right]. \quad (19)$$

Equation (19) shows that, apart from an offset, $G^{(1)}(r_1)$ equals the outcome of the classical grating. As is well known from this classical device, a term $\cos((N-1)\delta(r_1))$ indeed appears in the intensity distribution, oscillating in space with N−1 times the modulation of the two-slit interference pattern. However, lower spatial frequencies may appear as well and contribute to $G^{(1)}(r_1)$. From the point of view of microscopy, the resolution is determined by the Rayleigh limit: an object can be resolved only if at least two principal maxima of the diffraction pattern are included in the image formation (Abbe's theory of the microscope).

According to this criterion, the use of $G^{(1)}(r_1)$ for imaging the N atoms may allow at best resolving an interatomic spacing equal to $\lambda$. By contrast, the use of the Nth order correlation function with N detectors positioned according to Eq. (10) (or Eq. (12)) may allow resolving an atom-atom separation as small as $\lambda/N$ (or $\lambda/N+1$)) [see Eqs. (11) or (13)]. In conclusion, it was shown that N photons of wavelength $\lambda$ spontaneously emitted by N atoms and coincidentally recorded by N detectors at particular positions may exhibit correlations and interference properties similar to classical coherent light of wavelength $\lambda/N$. The method requires neither initially entangled states nor multi-photon absorption, only common detectors suitable for single-photon detection.

Embodiments of the present invention make use of the findings described above. However, it is important to note that the invention is not limited to the described system of photons and atoms. Rather, various kinds of radiation may be used, including photons, electrons, protons, neutrons, alpha particles, atoms, molecules and ions. At the same time, the emitters or scattering sites may be selected from the group consisting of atoms, ions, molecules, quantum dots, and Josephson circuits.

Figure 2:
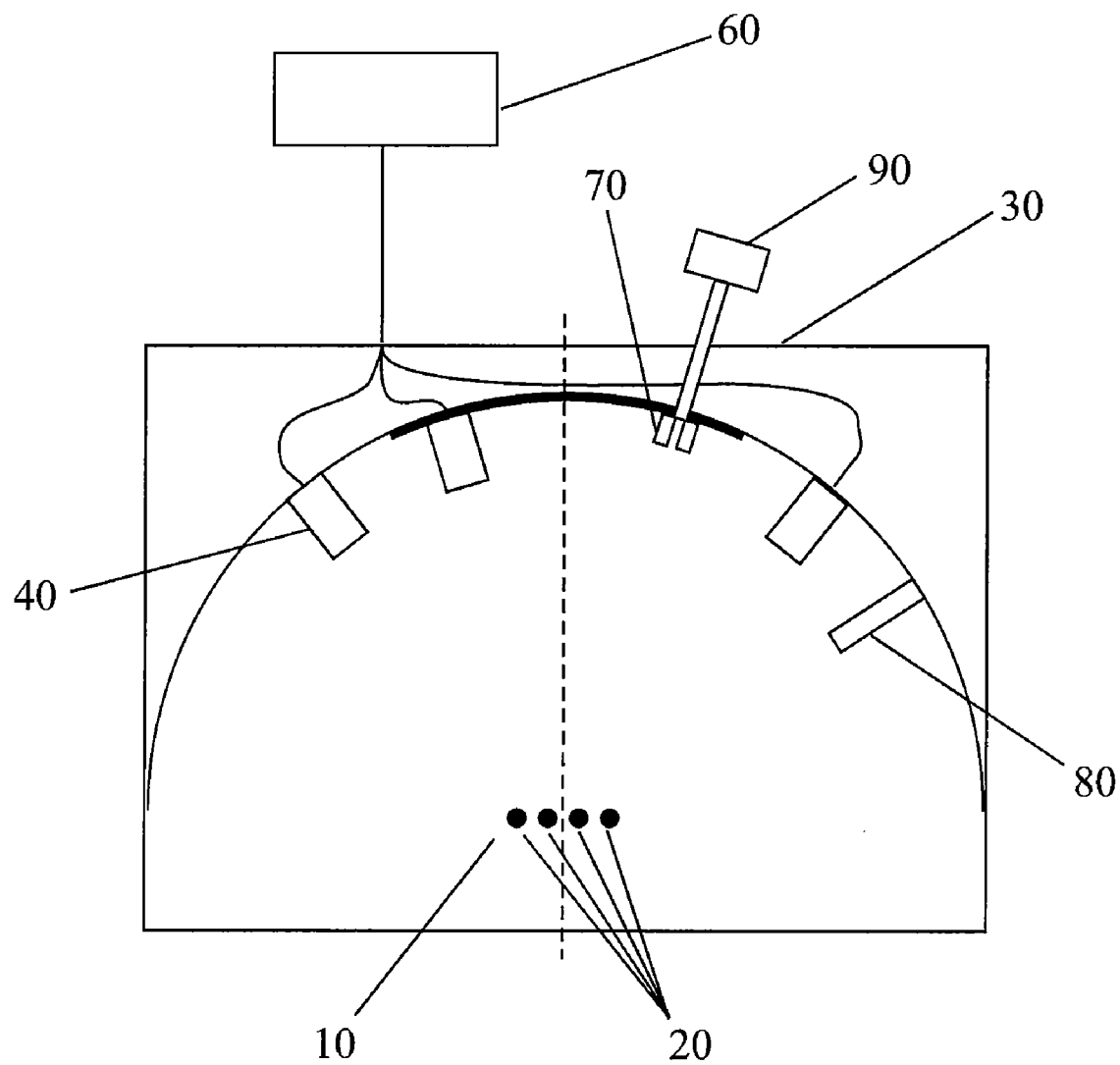
FIG. 2 is a schematic view of an apparatus in accordance with an embodiment of the invention in which N identical two-level emitters at $R_1, \ldots, R_N$ may spontaneously emit N particles after excitation by a laser pulse. The particles may be recorded in the far field by N−1 detectors positioned at $r_1, \ldots, r_{N-1}$. The figure exemplifies the case N=4, where three detectors may be combined with one particle barrier.

FIG. 2 shows an embodiment of the invention, in which an apparatus is provided to use one particle out of N quantum entangled particles for irradiating a target. The apparatus may comprise a radiation source (10) with a plurality of N incoherent emitters (20). In this example, N is chosen to be 4. These emitters may be, for example, atoms, ions, molecules, quantum dots or Josephson circuits. They are preferably, but not necessarily arranged in a row. Typically, the emitters may be kept in the evacuated chamber (30), wherein their positions are maintained, for example, by means of an atom or ion trap. The emitters may emit radiation particles which may be chosen from the group consisting of photons, phonons, electrons, protons, neutrons, alpha particles, atoms or ions. The apparatus may further comprise N−1 detectors (40) to detect the emitted radiation, which may be arranged in a plane with the emitters. The detectors may be chosen from the various types known from the art in accordance with the type of radiation.

The detectors may be connected to a discriminating device (60), which is adapted to discriminate particle detection events on all detectors within a predetermined time period. Typically, but not necessarily, the discriminating device (60) is an electronic device. Furthermore, the apparatus may comprise a particle barrier (70), which may be adapted to be opened depending on a discriminated detection on all N−1 detectors. The type of the particle barrier may be chosen depending on the type of radiation used. In the case of photons, for example, the particle barrier may be a liquid crystal display (LCD) device. The barrier should be suitably designed to allow short opening switching times. In case of photons, these times lie in a range of nanoseconds. A target for interaction with the emitted radiation is provided so that the particle barrier may be located between the radiation source and a target (90).

In an embodiment of the invention, a second radiation source (80) may serve to irradiate the emitters with radiation. Depending on the desired kind of radiation, the second source may, for example, comprise a laser, an electron source like a tube or an electron accelerator, a source of radioactive radiation of various types or a plasma device to produce ions. A part of the applied radiation may interact with the emitters and be scattered. Accordingly, these can be regarded to re-emit the radiation. The source for the applied radiation is typically, but not necessarily, a laser. In an embodiment, the applied radiation may be pulsed. Typically, but not necessarily, the combination of emitters and the applied radiation is suitably chosen such that no more than two energetic states of the emitters are selected in the scattering process.

In an embodiment of the invention, the N−1 detectors and the particle barrier may be positioned in accordance with the findings described above. Hence, by arranging the setup in the manner described below, a modulation of a signal generated by the accumulation of multiple detection events on the target may take the form of a pure sinus when at least one detector and/or the particle barrier are moved circumferentially around the target during an irradiation process.

The N−1 detectors and the particle barrier may be positioned about defined angular positions with respect to the radiation source. The distances of the detectors from the radiation source may be substantially similar. The angular positions $\theta_i$ of the detectors with respect to an axis perpendicular to the row of emitters may be derived from the calculations as described above. In particular, they may be calculated from Eq. (10) in case of an even number of N, from Eq. (12) in case of an odd number of N, and by taking into account the relation of Eq. (6).

The first terms of Eqs. (10) and (12) may determine the angles of the first of the N−1 detectors and the particle barrier (which can be regarded as a replacement of the Nth detector in the theoretical scenario above) to be of equal amount, but of opposite sign. Hence, these may be positioned symmetrically about an axis perpendicular to the row of emitters by an arbitrarily chosen angle $\theta_i$. Both the first detector and the target may be adapted to be movable in a circumferential direction with respect to the radiation source, whereby their movement is controlled in order to maintain the previously described angular relation (see FIG. 2). The positions of the remaining N−2 detectors may also be determined by Eqs. (10) and (12). The results of Eq. (10) or (12) for $\delta(r_i)$, which depend only on the number N of detectors used, may be used to calculate the angles of the detectors by applying Eq. (6), according to which $$\delta(r_i) = kd\sin\theta_i$$

Because d is the spacing between the emitters of the radiation source and k is the wave number of the emitted radiation, the angles $\theta_i$ may be derived by a simple calculation from the results of Eq. (10) or (12). $\theta_i$ refers to the angle between the position vector of detector i and the axis perpendicular to the row of emitters (see FIG. 2).

For small N, there are solutions according to which each of the N−1 detectors and the particle barrier have different angular positions $\theta_i$. Thus, the N−1 detectors may be disposed in one plane, which includes the row of emitters, at different angular positions $\theta_i$, as is shown in the example of FIG. 2.

Figure 5:
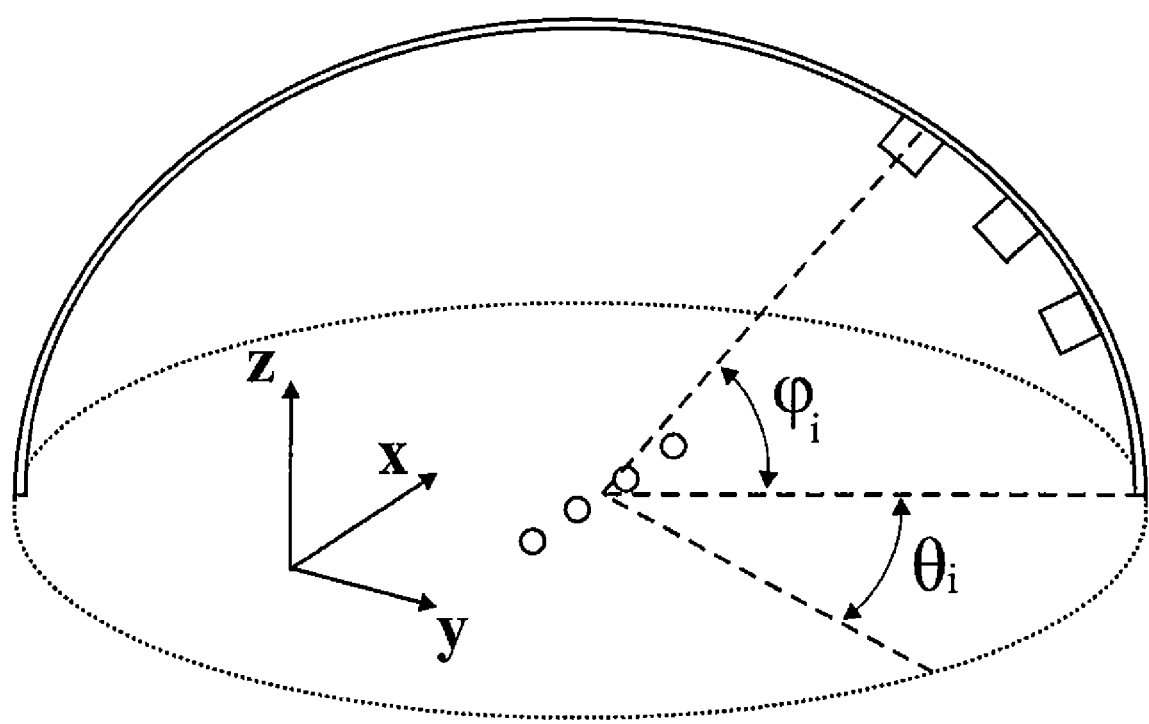
FIG. 5 is a schematic view of an apparatus in accordance with an embodiment of the invention wherein three detectors are arranged sharing the same angle $\theta_i$ at different angles $\phi_i$.

For any N, there are generally solutions where two or more of the detectors share the same angle $\theta_i$. Thus, detectors with the same angle $\theta_i$ may be disposed in a second plane perpendicular to the plane defined by the row of emitters, the first detector and the particle barrier. This further plane may share the angle $\theta_i$ with respect to an axis perpendicular to the row of emitters. The detectors may be arranged on the further plane about arbitrary angles $\phi_i$, however taking into account the spontaneous emission pattern of the considered atomic transition. By doing so, several detectors may be deployed sharing the same $\theta_i$, which is exemplarily shown in FIG. 5 for three detectors.

In an embodiment of the invention, one detector and the target may be moved along an angular range in opposite angular directions during an irradiation process. The size of this range may depend on several individual parameters including the properties of the radiation source and the target. It may need to be set up experimentally in order to achieve best results.

In a following discrimination step, particle detections detected on all N−1 detectors within a predetermined time interval may be discriminated from other particle detection events using a discrimination device. If an occurrence of detection events on all N−1 detectors is recognized, the particle barrier may be opened to allow passage of a particle. In an embodiment, the particle barrier may only be locally opened. After passing the opened barrier, the particle may be used to interact with the target.

In an embodiment of the invention, particles passing the particle barrier may be used for physical manipulation of a target object by means of interaction between the particle and the target object after their passage through the opened barrier. This manipulation may include lithography purposes, such as in the production of semiconductors. A pattern to be reproduced on a semiconductor substrate may be composed using sinusoidal modulations of different frequencies according to a Fourier decomposition of the structure of the pattern to be achieved.

Figure 3:
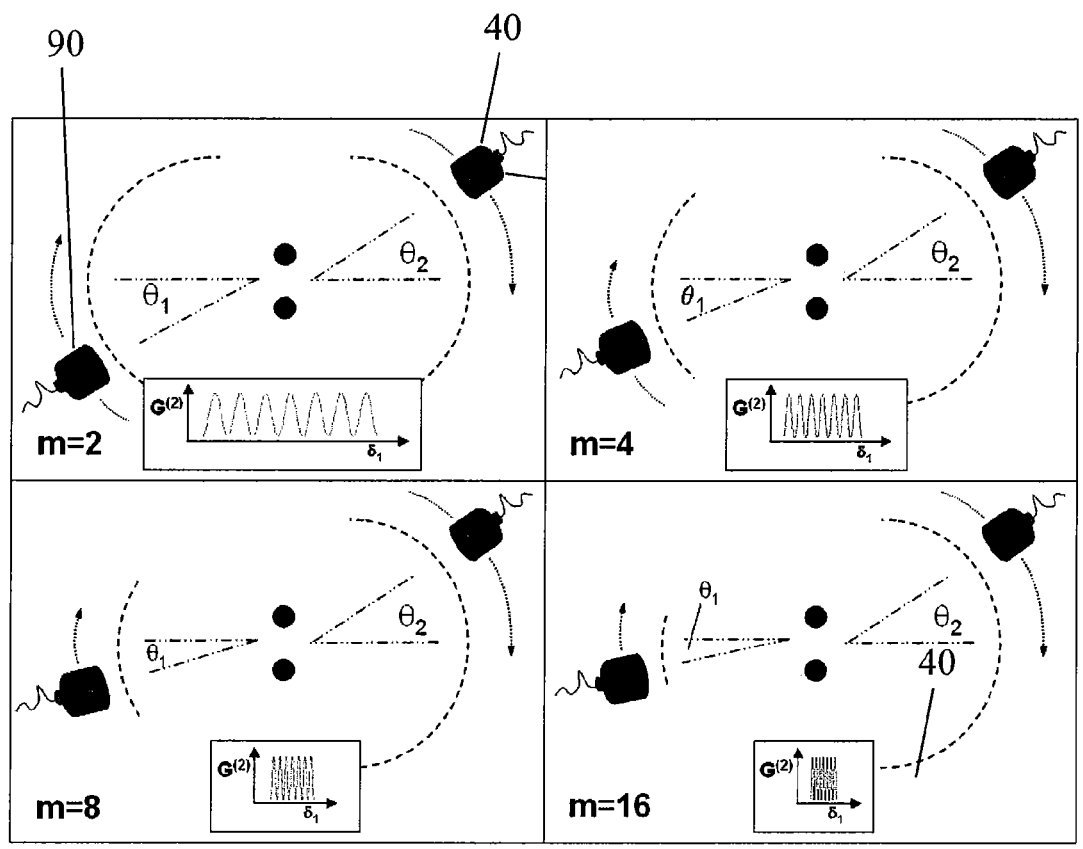
FIG. 3 is a schematic view of an apparatus with N=2 emitters in accordance with an embodiment of the invention. As depicted, one detector and a target may be moved circumferentially around the two emitters with angular velocities, wherein the angular velocity of the detector is m times greater than that of the target. Shown are cases for m=2, 4, 8, and 16.

FIG. 3 shows an embodiment of the invention with two scattering sites (N=2), a detector 40, and a target 90. Given Eq. (14), it can be seen that when choosing $\delta_2=(1-m)\delta_1$, where m can take arbitrary values, the $G^{(2)}$ function takes the following form:

$$G^{(2)}(\delta_1) = \frac{1}{2} + \frac{1}{2} \cdot \cos[m\delta_1].$$

Given the relation $\delta_i=kd \sin \theta_i$ (Eq. (6)), wherein each phase $\delta_i$ is limited within the interval [−kd, +kd] as the term $\sin \theta_i$ runs from −1 to +1 while $\theta_i$ can take all values within [−π/2, +π/2], solutions exist for the interval $\delta_1=$[−kd/m, +kd/m]. Within these boundaries, the movement of the detector and the target (respective to the particle barrier) may yield an accumulated signal at the target shown in FIG. 3 for various values of m. As is shown in the figure, the angular interval of the target (determined by $\theta_1$) decreases with growing m. However, the number of modulations within the corresponding angular interval may be kept constant. Thus, the optical resolution of the apparatus used for lithographic purposes may increase with growing m.

Figure 4:
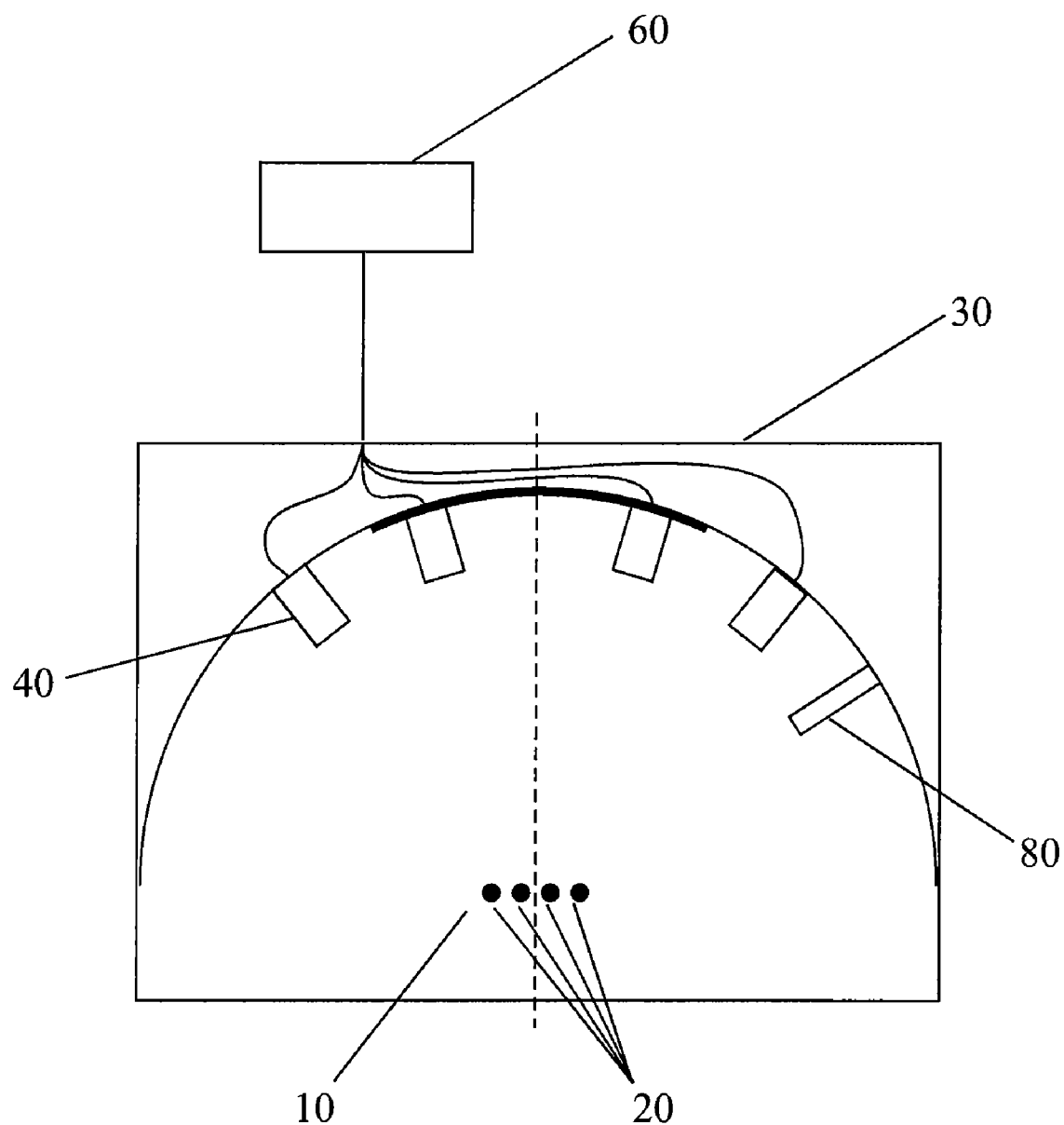
FIG. 4 is a schematic view of an apparatus in accordance with an embodiment of the invention, wherein N emitted particles may be recorded by N detectors in the far field to investigate an object constituted by N emitters.

FIG. 4 shows another embodiment of the invention, in which an apparatus is provided to use N quantum entangled particles for investigating an object. In this example, N is chosen to be 4. The apparatus may comprise an object which acts as a radiation source (10) with a plurality of N incoherent emitters (20). These emitters may be, for example, atoms, ions, molecules, quantum dots, or Josephson circuits. They are preferably, but not necessarily arranged in a row. Typically, they are kept in the evacuated chamber, wherein their positions may be maintained, for example, by means of an atom or ion trap. The emitters may emit radiation particles, which may be chosen from the group consisting of photons, phonons, electrons, protons, neutrons, alpha particles, atoms, molecules, or ions. The apparatus may further comprise N detectors (40) located at N different positions to detect emitted radiation, which may be arranged in a plane with the object comprising the emitters. The detectors may be chosen from the various types known from the art in accordance with the type of radiation used. A limitation on the type of detector may be that it is suitable to detect single particles of the radiation. The detectors may be connected to a discriminating device (60), which may be adapted to discriminate particle detection events taking place on all detectors within a predetermined time interval. Typically, but not necessarily, the discriminating device (60) is an electronic device.

In an embodiment of the invention, a second radiation source (80) may serve to irradiate the emitters with radiation. Depending on the desired type of radiation, the second source may, for example, comprise a laser, an electron source such as a tube or an electron accelerator, a source of radioactive radiation of various types, or a plasma device to produce ions. A part of this radiation may interact with the emitters and be scattered. Accordingly, these may be regarded as emitters re-emitting radiation. The source for the applied radiation is typically, but not necessarily a laser. For some embodiments, the applied radiation may be pulsed. Typically, it is chosen in a way so that no more than two energetic states of the emitters are selected in the scattering process.

The N detectors may be positioned about defined angular positions with respect to the radiation source. The distances of the detectors from the object may be chosen substantially arbitrarily, but should lie in the same order of magnitude for reasons of experimental practicability. The angular positions of the detectors with respect to an axis perpendicular to the object may be derived from the calculations as described above. In particular, they may be calculated from Eq. (10) in case of an even number of N, from Eq. (12) in case of an odd number of N, and by taking into account the relation of Eq. (6).

The first terms of Eq. (10) and (12) may determine the angles of the first and second of the N detectors to be of equal amount, but of opposite sign. Hence, these may be positioned symmetrically about an axis perpendicular to the row of emitters about an arbitrarily chosen angle. Both the first and second detectors may be adapted to be movable in a circumferential direction with respect to the object, whereby their movement may be controlled in order to maintain the previously described angular relation. The positions of the remaining N−2 detectors may also be determined by Eqs. (10) and (12). The results of Eq. (10) or (12) for $\delta(r_i)$, which depend only on the number N of detectors used, may be used to calculate the angles of the detectors by applying Eq. (6), according to which $$\delta(r_i)=kd \sin \theta_i$$

Because d is the spacing between the emitters of the object and k is the wave number of the emitted radiation, the angles $\theta_i$ may be derived by a simple calculation from the results of Eq. (10) or (12). $\theta_i$ refers to the angle between the position vector of detector i and the axis perpendicular to the row of emitters.

For small N, there may be solutions according to which each of the N detectors have different angular positions $\theta_i$. Thus, they may be disposed in one plane, which includes the row of emitters, at different angular positions $\theta_i$, as is shown in the example of FIG. 4.

For any N, there are generally solutions where two or more of the detectors share the same angle $\theta_i$. Thus, detectors with the same angle $\theta_i$ may be disposed in a second plane perpendicular to the plane defined by the row of emitters, the first detector, and the particle barrier. This further plane may share the angle $\theta_i$ with respect to an axis perpendicular to the row of emitters. The detectors may be arranged on the further plane about arbitrary angles $\phi_i$. By doing so, several detectors may be deployed sharing the same $\theta_i$, which is exemplarily shown in FIG. 5 for three detectors.

In an embodiment of the invention, the first and second detector may be moved along an angular range in opposite angular directions during an irradiation process. The size of this range may depend on several individual parameters, such as the properties of the radiation source and the object. Best results for this range may be empirically determined.

During irradiation, particle detections detected within a predetermined time interval on all N detectors may be discriminated using a discrimination device. If an occurrence of detection events on all N detectors within a specific time interval is recognized, this event may be counted by a counting device.

By arranging the N detectors in the angular relation described above, a modulation of a signal generated by the accumulation of multiple N-particle detection events may take the form of a pure sinus-oscillation when the object consists of N incoherent emitters and at least one of the detectors is moved. By analyzing the modulation of the accumulated radiation, calculations may be carried out on the structure of the object (e.g., the interatomic spacing). Thus, the apparatus and the described method may be suitable for microscopic investigations into the object constituted by the emitters.

Embodiments of the invention may also be directed to an apparatus for carrying out the disclosed methods including apparatus parts for performing each described method step. These method steps may be performed by way of hardware components, a computer programmed by appropriate software, by any combination of the two, or in any other manner. Furthermore, embodiments of the invention may also be directed to methods by which the described apparatus operates, including method steps for carrying out every function of the apparatus.

What is claimed is:

1. A method for using one particle out of N particles for irradiating a target, comprising:
    providing a radiation source with N incoherent emitters;
    detecting radiation particles emitted from the radiation source by using N−1 detectors located at N−1 different positions; and
    opening a particle barrier based on an occurrence of single detections on all N−1 detectors within a predetermined time period to allow the one particle to reach the target.

2. The method according to claim 1, wherein the radiation particles are chosen from a group consisting of photons, phonons, electrons, protons, neutrons, alpha particles, atoms, molecules, and ions.

3. The method according to claim 1, wherein the emitters are chosen from a group consisting of atoms, ions, molecules, quantum dots, and Josephson circuits.

4. The method according to claim 1, wherein the emitters are arranged in a row.

5. The method according to claim 1, wherein the N−1 detectors are arranged in a plane which includes the radiation source.

6. The method according to claim 1, wherein at least one of the N−1 detectors is adapted to be movable during irradiation.

7. The method according to claim 1, wherein the N−1 detectors and the target are arranged at positions with respect to the radiation source so that a modulation of a signal generated by the accumulation of multiple detection events at the target takes a form of a pure sinus oscillation when at least the one detector and/or the particle barrier is moved.

8. The method according to claim 1, wherein at least one of the N−1 detectors and/or the particle barrier is moved circumferentially around the radiation source.

9. The method according to claim 8, wherein one of the N−1 detectors and the particle barrier are circumferentially moved around the radiation source in opposite angular directions with respect to each other.

10. The method according to claim 1, wherein radiation emitted by the emitters is scattered radiation caused by an application of radiation to said emitters by a second radiation source.

11. The method according to claim 10, wherein the radiation source is a pulsed radiation source.

12. The method according to claim 10, wherein not more than two energetic states of the emitters are selected in the scattering process.

13. The method according to claim 10, wherein the second radiation source is a laser.

14. The method according to claim 1, wherein the particle barrier is only locally opened.

15. The method according to claim 1, further comprising using a particle having passed the particle barrier for physical manipulation of a target by means of interaction between the particle and the target.

16. The method according to claim 1, wherein the irradiation of the target is used for lithography.

17. An apparatus for irradiating a target, comprising:
    a radiation source having N incoherent emitters;
    N−1 particle detectors located at N−1 different positions;
    a discriminator adapted for identifying single particle detection events on all N−1 detectors within a predetermined time period from other particle detection events; and
    a particle barrier adapted to be opened based on the discriminator.

18. The apparatus of claim 17, wherein the emitters are adapted to emit particles chosen from the group consisting of photons, phonons, electrons, protons, neutrons, alpha particles, atoms, molecules, and ions.

19. The apparatus of claim 17, wherein the emitters are chosen from the group consisting of atoms, ions, molecules, quantum dots, and Josephson circuits.

20. The apparatus of claim 17, further comprising a device adapted to maintain the positions of the emitters.

21. The apparatus of claim 17, wherein the N−1 detectors are arranged in a plane which includes the radiation source.

22. The apparatus of claim 17, further comprising a second radiation source.

23. The apparatus of claim 22, wherein the second radiation source is a pulsed radiation source.

24. The apparatus of claim 22, wherein the second radiation source is a laser.

25. The apparatus of claim 17, wherein at least one of the N−1 detectors is adapted to be movable during irradiation.

* * * * *

UNITED STATES PATENT AND TRADEMARK OFFICE
CERTIFICATE OF CORRECTION

PATENT NO. : 7,518,127 B2 Page 1 of 1
APPLICATION NO. : 11/615547
DATED : April 14, 2009
INVENTOR(S) : von Zanthier et al.

It is certified that error appears in the above-identified patent and that said Letters Patent is hereby corrected as shown below:

Column 4, Line 1, please delete
"$G^{(N)}(r_L, ..., r_N) = \langle D^\dagger(r_1) \ldots D^\dagger(r_N) D(r_N) \ldots D(r_1) \rangle$     (1)" and insert
--$G^{(N)}(r_1, ..., r_N) = \langle D^\dagger(r_1) \ldots D^\dagger(r_N) D(r_N) \ldots D(r_1) \rangle$     (1)-- therefor.

Signed and Sealed this

Twenty-eighth Day of July, 2009

JOHN DOLL
*Acting Director of the United States Patent and Trademark Office*